June 7, 1932. M. B. O'BRIEN 1,862,420
BROILER
Filed Oct. 6, 1931

Inventor
Mary B. O'Brien
By C. A. Snow & Co.
Attorneys.

Patented June 7, 1932

1,862,420

UNITED STATES PATENT OFFICE

MARY BUXTON O'BRIEN, OF CHICAGO, ILLINOIS

BROILER

Application filed October 6, 1931. Serial No. 567,278.

This invention relates to a broiler designed primarily for use over the flames of gas and oil stoves.

One of the objects is to provide a simple and efficient utensil utilizing a perforated bottom member having gutters for trapping the juices and collecting them where they can readily be poured off.

A further object is to provide the member with a rack or grid firmly but removably seated thereon whereby the meat being cooked will be properly supported.

Another object is to cover the food to retain the heat and fumes during the cooking operation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

Figure 1:
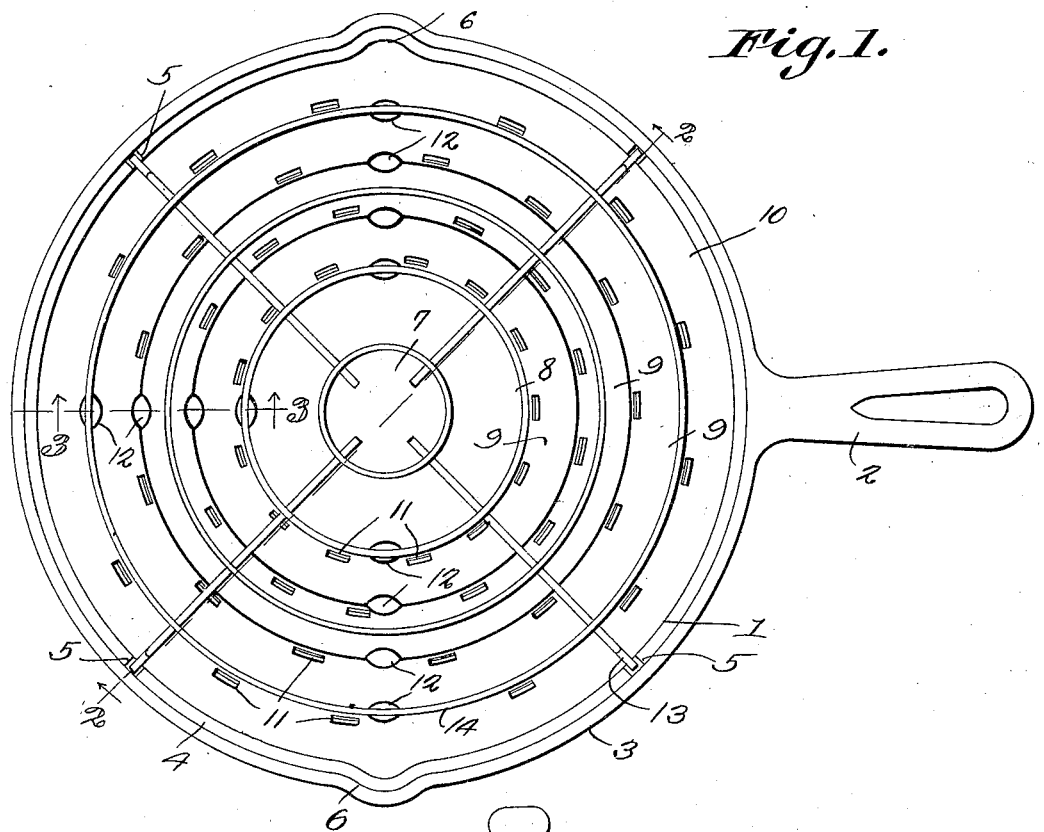
Figure 1 is a plan view with the cover removed.
Figure 2:
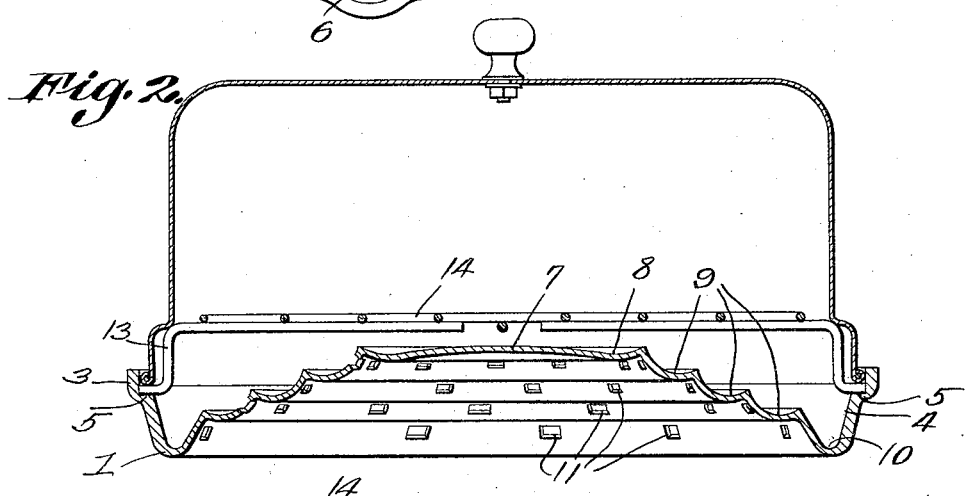
Figure 2 is a central vertical section on line 2—2, Figure 1, the cover being in position.
Figure 3:
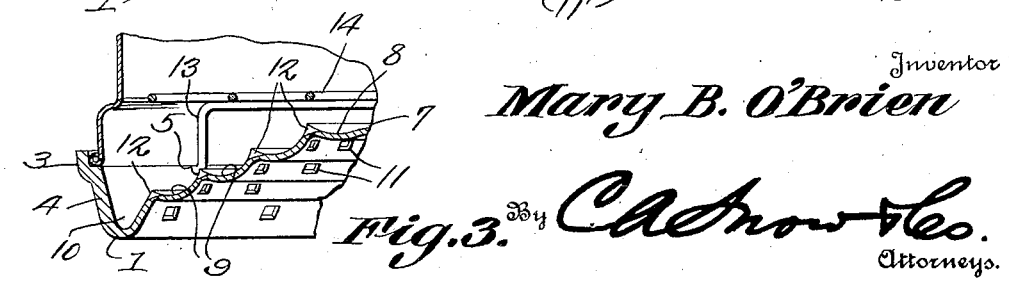
Figure 3 is a section on line 3—3, Figure 1, the cover being in position.

Referring to the figures by characters of reference, 1 designates a base-member with a handle 2 so as to present the general appearance of a frying pan or skillet. The flange 3 is offset outwardly at its upper edge to provide an interior annular shoulder 4 provided with regularly spaced notches 5. Pouring spouts 6 can be extended from the flange 3 as shown.

The bottom of the base has a central circular raised portion 7 the marginal portion of which is concaved annularly to provide a circular gutter 8. The bottom is stepped downwardly from the central portion 7 to form shallow circular gutters 9 at different elevations and a deep trap or circular gutter 10 is provided between flange 3 and the lower gutter 9. The pouring spouts 6 open into this trap.

The inner wall of trap 10 and of each of the gutters 9 is provided with an annular series of apertures 11 above the bottom level of the trap or gutter with which they are associated. Furthermore, the outer edge of each gutter 8 and 9 has short drain channels or notches 12 through which juices can gravitate from each gutter to the next one thereunder and finally to the trap 10.

The notches 5 are adapted to receive the out-turned lower ends of short legs 13 supporting a grid 14 formed of concentric rings of wire. The grid is held removably above the raised center 7 of the bottom and is adapted to support the meat being broiled.

A cover 15 is to be placed over the grid. The lower edge thereof is adapted to rest on shoulder 4 and by means of a knob 16 the cover can easily be placed in or removed from position.

In practice the meat to be broiled is placed on the grid and, if desired, the cover can be placed thereover. By means of handle 2 the device can be placed over a gas or oil flame and the flames and heat will pass through the openings 11 so as to broil the meat quickly and as thoroughly as desired.

The juices given off during the cooking process will drip into the several gutters and flow to the trap 10. Thereafter, following removal of the utensil from above the flame, it can be tilted to pour the juices from either of the spouts 6.

The rack is easily removable for cleaning and as it is seated in recesses 5 it will not become displaced while the utensil is being handled.

What is claimed is:

1. A utensil comprising a skillet having annular gutters stepped upwardly from the side flange to a raised center thereby forming the bottom of the skillet, the outer edges of the gutters being provided with drain recesses or channels for the gravitation of juices from one gutter to another, there being openings in the inner walls of the gutters above the levels assumed by juices in the gutters, a grid extending over the bottom of the skillet, and supporting legs therefor, there being notches in the flange of the skillet for receiving the legs and holding the grid against radial and annular displacement.

2. A utensil comprising a skillet having annular gutters stepped upwardly from the side flange to a raised center thereby forming the bottom of the skillet, the outer edges of the gutters being provided with drain recesses or channels for the gravitation of juices from one gutter to another, there being openings in the inner walls of the gutters above the levels assumed by juices in the gutters, the upper edge of the flange of the skillet providing an interior annular shoulder having spaced notches, a grid seated in the notches and extending over the bottom, and a cover removably seated on the shoulder.

In testimony that I claim the foregoing as my own, I have hereto affixed my signature.

MARY BUXTON O'BRIEN.